3,743,646
AMIDES OF 3-(2-HALOPHENYL-5-TETRAZOLYL) PROPIONIC ACIDS
Robert Thomas Buckler, Edwardsburg, Mich., and Wallace Glenn Strycker, Goshen, Ind., assignors to Miles Laboratories, Inc., Elkhart, Ind.
No Drawing. Filed Nov. 9, 1970, Ser. No. 88,136
Int. Cl. C07d 29/28
U.S. Cl. 260—293.69       3 Claims

ABSTRACT OF THE DISCLOSURE

Certain amides of 3-(2-halophenyl-5-tetrazolyl)propionic acids are disclosed and a method for their preparation. These compounds are useful as antiinflammatory agents and produce less gastric irritation than the acids from which they are prepared.

SUMMARY OF THE INVENTION

This invention is directed to compounds of the formula:

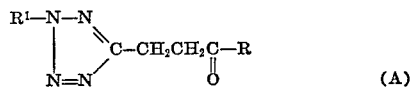

(A)

wherein R is amino or piperidino, and $R^1$ is monohalophenyl in which the halogen is bromine, chlorine, fluorine or iodine. These amides display antiinflammatory properties when administered orally to animals at a dosage of 100 milligrams per kilogram of body weight and in addition possess the unexpected but highly desirable property of producing less gastric irritation than the corresponding acids.

The novel compounds of this invention can be prepared by the reaction of a halogenating agent such as cyanuric chloride, thionyl bromide, phosphorus pentachloride, thionyl chloride or phosphorus oxychloride with a 3-(2-halhophenyl-5-tetrazolyl)propionic acid of the formula:

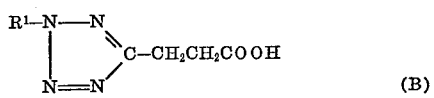

(B)

and subsequent reaction of the corresponding halide thus formed with an R—H amine. Although the reaction conditions are not critical, it is preferable to carry out the halogenation reaction with an excess of the halogenating agent under reflux, whereas the amination reaction is conducted in a solvent such as tetrahydrofuran at room temperature. Upon completion of the reaction, the solvent is removed and the residue recrystallized from pentane or an ethanol-water mixture to obtain the desired amide product as a crystalline solid. Alternatively, when the reaction is complete, the resulting solution can be suspended in water, extracted with chloroform, the extract dried and evaporated and the residue finally recrystallized. Details of the preparations are set forth in the examples which follow.

PREFERRED EMBODIMENTS

Example 1

R is NH₂ and $R^1$ is 3-bromophenyl in Formula A.

A solution of 5 grams (0.017 mole) of 3-[2-(3-bromophenyl)-5-tetrazolyl]propionic acid (melting point=99° C.) in 50 ml. of thionyl chloride was heated under reflux for 90 minutes. The excess chloride was then removed and the residue taken up in tetrahydrofuran which was thereafter cooled and saturated with ammonia gas. The solvent was removed and the solid residue recrystallized from ethanol-water to yield 3.5 grams of 3-[2-(3-bromophenyl)-5-tetrazolyl]propionamide as a white solid melting at 116° C. and containing 3.35% hydrogen compared to 3.38% hydrogen calculated.

Example 2

R is piperidinyl and $R^1$ is 3-bromophenyl in Formula A.

Fifteen grams (0.05 mole) of 3-[2-(3-bromophenyl)-5-tetrazolyl]propionic acid in 100 ml. of thionyl chloride was refluxed for one hour. The excess thionyl chloride was removed and the residue dissolved in tetrahydrofuran. The resulting solution was then added dropwise to 8.6 grams (0.1 mole) of piperidine in tetrahydrofuran. Upon completion of the reaction, water was added and the aqueous solution extracted with chloroform. The extract was evaporated and the residue recrystallized from pentane to obtain 11.8 grams of N-3-[2-(3-bromophenyl)-5-tetrazolyl]propionyl piperidine as a crystalline solid with a melting point of 45° C. which upon analysis was found to contain 19.28% nitrogen, whereas the calculated value was 19.23% nitrogen.

The 2-halophenyl-5-tetrazolyl carboxylic acids employed as starting materials in the present invention can be prepared by known methods, for example, as described in Berichte, 43, 2899 (1910). These acids are esterified to give the ethyl esters which are reduced with lithium borohydride in tetrahydrofuran to yield the 2-halophenyl-5-hydroxymethyltetrazoles. Further reaction with thionyl chloride results in the formation of the chloromethyl derivatives which are alkylated with sodium diethylmalonate to produce the diesters which upon hydrolysis form the desired propionic acids of Formula B.

In a representative operation, 53 grams (0.197 mole) of 2-(3-bromophenyl)-5-tetrazolylcarboxylic acid (melting point=152° C.) in 800 ml. of ethanol was saturated with HCl gas and allowed to stand at room temperature for 5 days. The solvent was removed and the residue recrystallized from pentane to yield 52 grams of ethyl 2-(3-bromophenyl)-5-tetrazolyl carboxylate with a melting point of 75° C. This intermediate was dissolved in tetrahydrofuran and added dropwise to a hot, stirred suspension of LiBH₄ (14.2 grams, 0.65 mole) in 200 ml. of the same solvent. The mixture was refluxed for 5 hours, cooled and acidified, then dissolved in chloroform, washed with dilute aqueous HCl, dried over magnesium sulfate, evaporated and the solid recrystallized from a benzene-pentane mixture to yield 43 grams of 2-(3-bromophenyl)-5-hydroxymethyl tetrazole which melted at 83° C. A solution of said compound in 100 ml. of thionyl chloride was warmed to 60° C. for 90 minutes, the excess chloride thereafter removed and the crude 2-(3-bromophenyl-5-chloromethyltetrazole formed was dissolved in warm ethanol. The ethanolic solution was added to 54 grams (0.336 mole) of diethylmalonate and 3.9 grams of sodium in more ethanol and refluxed for 5 hours. The ethanol was then removed and the diester residue hydrolyzed and decarboxylated by refluxing for 18 hours in 200 ml. of equal parts of concentrated hydrochloric acid and glacial acetic acid. The reaction mixture was finally filtered, concentrated and dried. Recrystallization of the solid residue from benzene-pentane produced 25.8 grams of 3-[2-(3- bromophenyl)-5-tetrazolyl]propionic acid as a crystalline solid with a melting point of 99° C.

What is claimed is:

1. An amide of the formula:

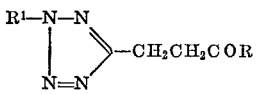

in which R is selected from the group consisting of amino and piperidino, and $R^1$ is selected from the group of mono-halophenyl.

2. A compound as in claim 1 in which R is amino and $R^1$ is 3-bromophenyl.

3. A compound as in claim 1 in which R is piperidinyl and $R^1$ is 3-bromophenyl.

References Cited

UNITED STATES PATENTS

Re. 26,655    8/1969    Sherlock et al. _____ 260—295.5
3,454,587    7/1969    Littell et al. _____ 260—295.5

ALEX MAZEL, Primary Examiner

J. TOVAR, Assistant Examiner

U.S. Cl. X.R.

260—308 D; 424—267